(No Model.)

W. H. BINNS.
BALL BEARING FOR BICYCLES.

No. 473,816. Patented Apr. 26, 1892.

ATTEST:
Geo. H. Arthur
J. A. Young

INVENTOR:
William H. Binns,
by Robert S. Burns
Attorney.

UNITED STATES PATENT OFFICE.

WILLIAM H. BINNS, OF CHICAGO, ILLINOIS, ASSIGNOR TO THE CHICAGO SEWING MACHINE COMPANY, OF SAME PLACE.

BALL-BEARING FOR BICYCLES.

SPECIFICATION forming part of Letters Patent No. 473,816, dated April 26, 1892.

Application filed December 9, 1891. Serial No. 414,499. (No model.)

*To all whom it may concern:*

Be it known that I, WILLIAM H. BINNS, a citizen of the United States, residing at Chicago, in the county of Cook and State of Illinois, have invented a certain new and useful Improvement in Ball-Bearings for Bicycles; and I do hereby declare the following to be a full, clear, and exact description of the same, reference being had to the accompanying drawings, forming part of this specification.

This invention relates to the usual ball-bearing now in general use in bicycles and like vehicles, its object being to provide a simple and effective means for holding the balls in place in taking the journal apart to prevent the accidental spilling and loss of the balls in such operation. I attain such object by the construction and arrangement of parts illustrated in the accompanying drawings, in which—

Figure 1:
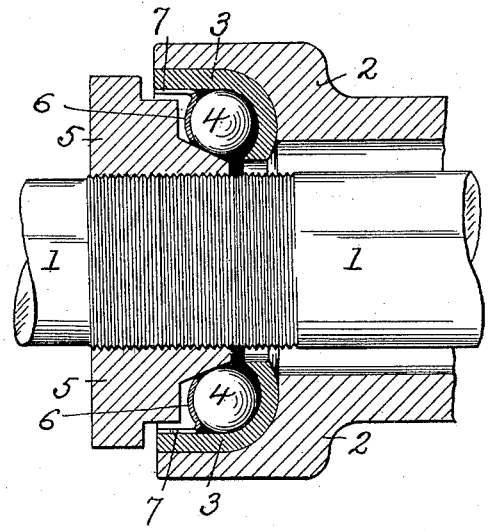
Figure 2:
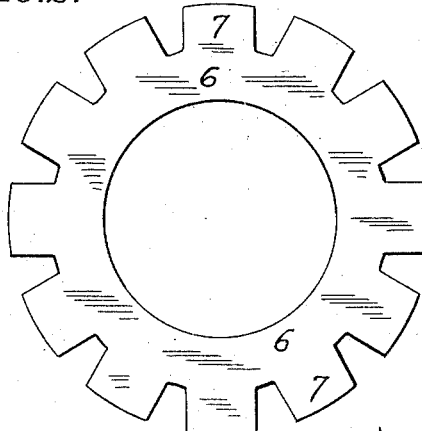

Figure 1 is an enlarged detail section, with parts in elevation, illustrating my present improvement applied to the ordinary ball-bearing of a bicycle; Fig. 2, an enlarged elevation of the blank from which my improved ball-holder is formed, and Fig. 3 an enlarged central section of the same.

Similar numerals of reference indicate like parts in the different views.

Referring to the drawings, 1 represents the shaft or spindle, and 2 the hub or bearing, either one or the other being adapted to rotate in accordance with the special use of the parts.

3 is an annular cup-shaped bushing inserted in the hub 2 and forming one of the bearing-tracks for the series of friction-reducing balls 4, the other track being formed by an inclined extension on the sleeve or collar 5 of the shaft 1.

Figure 3:
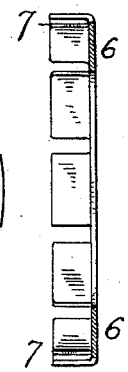

In the present improvement 6 is a ball-holder for retaining the balls within the bushing 3 when the parts are taken apart, and consists of an annular disk portion, either plane, as indicated in Fig. 3, or provided with an annular track or depression, as indicated in Fig. 1, and having its margin slotted radially to form the series of spring-plates 7, that are bent at right angles to the body or disk portion to constitute spring-holding fingers or extensions that in use secure the holder by friction against the inner periphery of the bushing, as indicated in Fig. 1, so as to form with the inner curved wall of said bushing an annular chamber that holds the balls in proper annular arrangement or position.

My improved holder is capable of adaptation to any of the usual forms of ball-bearings and is capable of ready application and removal, as required.

Having thus fully described my said invention, what I claim as new, and desire to secure by Letters Patent, is—

1. The combination, with a ball-bearing constructed, essentially, as herein described, of the ball-holder 6, having an annular disk-shaped body and a series of bent spring-fingers 7, substantially as set forth.

2. The combination, with a ball-bearing constructed, essentially, as herein described, of the ball-holder 6, having an annular disk-shaped body formed with an annular depression or track, and a series of bent spring-fingers 7, substantially as set forth.

In testimony whereof witness my hand this 7th day of December, 1891.

WILLIAM H. BINNS.

In presence of—
J. W. KISER,
ROBERT BURNS.